(12) United States Patent
Rivkin et al.

(10) Patent No.: US 8,947,820 B1
(45) Date of Patent: Feb. 3, 2015

(54) WRITE PULSE WITH ADJUSTABLE SLEW RATE

(71) Applicant: Seagate Technology LLC, Cupertino, CA (US)

(72) Inventors: Kirill Rivkin, Eden Prairie, MN (US); Yanzhang Liu, Bloomington, MN (US); Mourad Benakli, Eden Prairie, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/266,569

(22) Filed: Apr. 30, 2014

(51) Int. Cl.
*G11B 15/12* (2006.01)

(52) U.S. Cl.
USPC .......................................... 360/61

(58) Field of Classification Search
CPC .. G11B 2005/0021; G11B 5/012; G11B 5/02; G11B 19/02

USPC ............... 360/66, 31, 59, 46, 61, 68, 119.02, 360/123.02

See application file for complete search history.

(56) References Cited

U.S. PATENT DOCUMENTS

| | | | |
|---|---|---|---|
| 4,295,168 A * | 10/1981 | Muller | 360/66 |
| 6,826,003 B1 | 11/2004 | Subrahmanyam | |
| 7,154,687 B2 | 12/2006 | Ikekame et al. | |
| 7,372,649 B2 * | 5/2008 | VanEaton et al. | 360/46 |
| 7,830,631 B2 | 11/2010 | Nakagawa et al. | |
| 2009/0284863 A1 * | 11/2009 | Uno | 360/75 |
| 2014/0118861 A1 * | 5/2014 | Funayama | 360/119.02 |

* cited by examiner

*Primary Examiner* — Nabil Hindi
(74) *Attorney, Agent, or Firm* — HolzerIPLaw, PC

(57) ABSTRACT

The implementations disclosed herein provide for a storage device including a preamplifier that generates a write current pulse having a region of reduced slew rate that temporally correlates with a time when a magnetization of a write pole tip switches polarity.

20 Claims, 6 Drawing Sheets

WRITE PULSE WITH ADJUSTABLE SLEW RATE

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

Implementations described and claimed herein provide a storage device with a preamplifier configured to generate a write current pulse having a region of reduced slew rate temporally coinciding with a time when a magnetization of a write pole tip switches polarity.

BRIEF DESCRIPTIONS OF THE DRAWINGS

DETAILED DESCRIPTION

In magnetic recording, data is written to and read from the individual bits along a series of circular or nearly circular data tracks on a media (e.g., a magnetic disc) using a transducer head aligned with the data tracks. A transducer head typically has at least one write element (the "writer") and at least one read element (the "reader"). To write data to an individual data bit, the writer emits a magnetic field pulse sufficient to change a magnetic orientation of a bit. The timing and strength of these magnetic pulses is controlled by an analog current signal (the "write current"), which includes a series of current pulses timed to arrive at the writer while when the transducer head travels over a bit location on the media. At the writer, each current pulse typically travels through a coil, generating a corresponding magnetic pulse that flips a bit, writing data to the media.

In some systems, on-track writer performance can be improved by increasing the slope, also referred to as the slew rate, of a leading edge of a current pulse. In some systems, a trade-off exists between dynamic performance of the system and incidental data erasure. For example, at high data rates, single-bit transitions may record better when a current slew rate is high. However, a high current slew rate can cause an incidental increase in erasure of data on a data track adjacent to a targeted data track. Therefore, techniques to improve on-track system performance can pose challenges to data erasure mitigation.

Various write current pulse shapes and other design changes can correspond to different degrees of this "trade-off" between system performance and erasure. The technology disclosed herein explores these different trade-off metrics and provides various write current pulse "shaping" techniques that change magnetization dynamics to offer erasure benefits without substantially changing other writer performance metrics.

Figure 1:
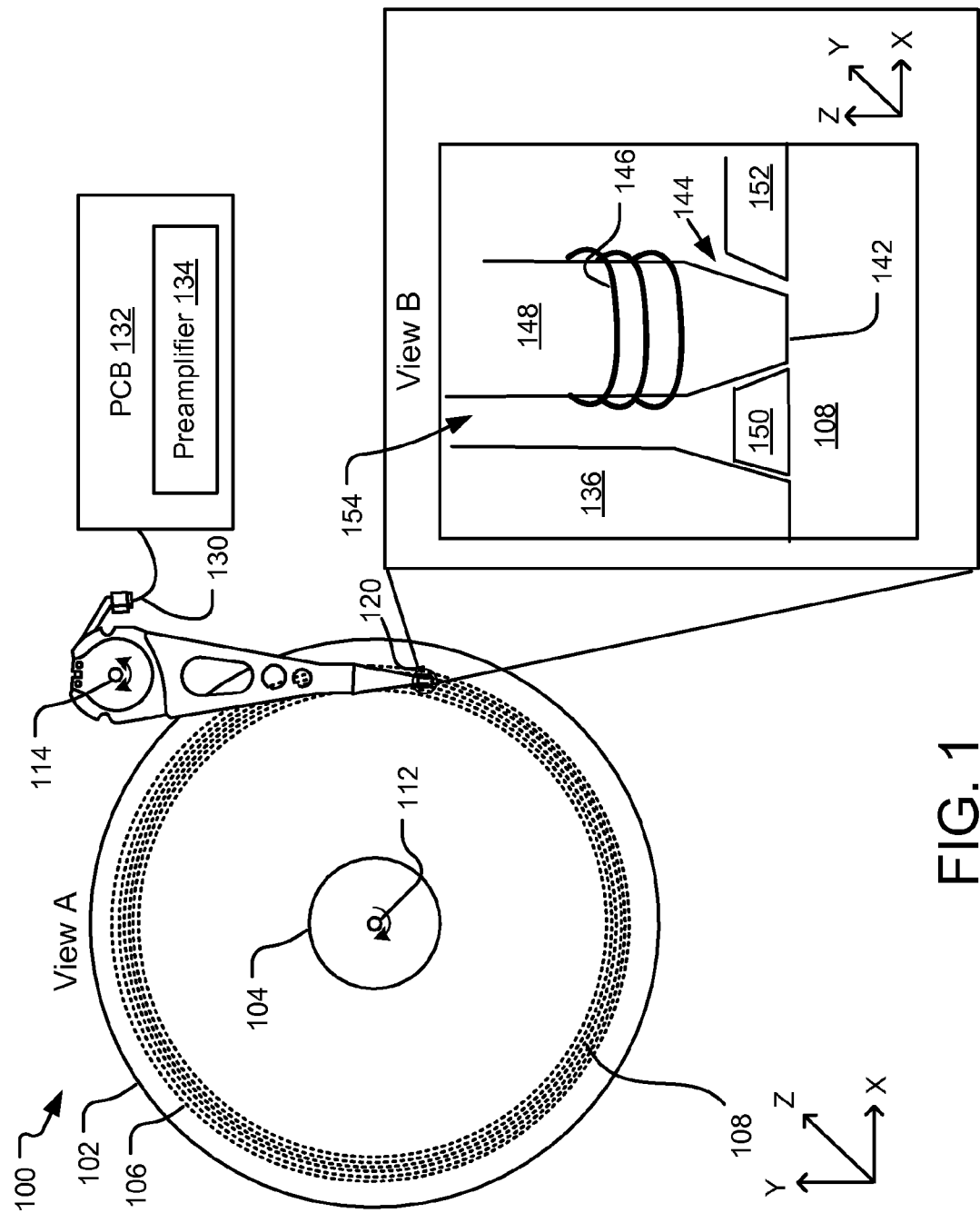
FIG. 1 illustrates an example disc drive assembly including preamplifier circuitry for providing time-dependent shaping of a write pulse.

FIG. 1 illustrates an example disc drive assembly 100 including preamplifier circuitry 134 for providing time-dependent shaping of a write pulse. The disc drive assembly 100 includes a transducer head 120 on a distal end of an actuator arm positioned over a magnetic media 108. A rotary voice coil motor (not shown) that rotates about an actuator axis of rotation 114 is typically used to position the transducer head 120 over a selected data track and a spindle motor that rotates about disc axis of rotation 112 is used to rotate the media 108. The media 108 includes an outer diameter 102 and an inner diameter 104 between which are a number of data tracks 106, illustrated by circular dotted lines. In one implementation, the media 108 rotates at a constant high speed about a disc axis of rotation 112 as information is written to and read from the data tracks 106 on the media 108.

Information can be written to and read from the bits on the media 108 through the use of the actuator arm 110. The actuator arm 110 rotates about the actuator axis of rotation 114 during a seek operation to locate a desired data track on the media 108. The actuator arm 110 extends toward the media 108 such that the transducer head 120 flies in close proximity above the media 108 while reading data from and writing data to the media 108.

The transducer head 120 includes a reader (not shown) that reads data from the bits on the media 108, and also includes a write pole 148 (shown in exploded View B) that writes data to the bits on the media 108. A flex cable 130 provides the requisite electrical connection paths for the transducer head 120 while allowing pivotal movement of the actuator arm 110 during operation. The flex cable 130 connects a printed circuit board (PCB) 132 to the transducer head 120. The PCB 132 includes a preamplifier 134 for controlling the write current applied to the transducer head 120 during a write operation. In particular, the preamplifier 134 sends a train of current pulses from the PCB 132, through the flex cable 130, and to bond pads attached to the exterior of the transducer head 120. Each of the current pulses is then passed through one or more write coils (e.g., a write coil 146) of the writer 154. The write coils of the writer 154 function to transform each electrical current pulse into a magnetic field pulse and direct the resulting magnetic flux density through a write pole 148 to write data to the media 108. In the implementation shown, the writer 154 includes the write pole 148, a return pole 136, and the write coil 146. Other implementations are also contemplated.

A magnetic pulse is generated by passing a current pulse through the coil 146. In response to this current pulse, write pole 148 starts to reverse in magnetic polarity until eventually, the magnetic field generated by the write pole 148 is strong enough to "write" (e.g., to flip a data bit) on the media in the reversed direction (e.g., a direction opposite a direction of initial magnetic field generated by the write pole 148). However, before the write pole 148 is more or less uniformly magnetized in the reversed direction, there are multiple alternative paths that can be taken by the magnetic flux. In certain circumstances, magnetic flux can leak into shields of the writer (e.g., shields 150 or 152) and spill into the underlying media 108 along unpredictable paths. This flux leakage may result in erasure of data on adjacent data tracks.

One cause of magnetic flux leakage into the shields is a charge build-up that occurs in a flare region 144 during a time when the magnetic field generated by the write pole 148 is weak. This charge build-up may occur because the area of the write pole 148 in proximity to the coil 146 responds to current changes faster than the tip 142 of the write pole 148. As a result, stray flux paths into the shield 150 and 152 form, and increase in strength when the average magnetic field generated by write pole 148 approaches zero (e.g., during a switching event). At this point in time, the write pole 148 no longer generates an established flux path through the shields (e.g., the shields 150 and 152). Implementations herein seek to mitigate erasure attributable to this type of flux leakage.

As used herein, the term "critical erasure time period" refers to a time period when erasure is likely to occur due to flux leakage occurring near the flare region 144 and into shields (e.g., shields 150 and 152), as illustrated in FIG. 1. The critical erasure time period typically correlates with a time when the average amplitude of magnetization of the write pole 148 is weak, such as when magnetic field generated by the write pole 148 undergoes a reversal of magnetic polarity.

In some implementations, the critical erasure time period ranges in duration from a few tens of picoseconds to up to more than 100 picoseconds. The critical erasure time period may commence immediately when the write coil 146 receives the write pulse, or the commencement of the critical erasure time period may be delayed by a time after the write coil 146 receives the write current pulse. Both the duration and start/stop boundaries of the critical erasure time period may differ for each writer and/or from one system to another. In one implementation, the critical erasure time period is determined experimentally during testing of the writer 154 when data erasure is likely.

In the presently-disclosed system, the preamplifier 134 includes circuitry to generate a write current pulse shaped to include certain time-dependent characteristics that minimize unintentional erasure of data stored on the media 108. In particular, the preamplifier 134 is adapted to generate a write current pulse with regions of fast slew rate and slow slew rate positioned so as to reduce current leakage that contributes to unintentional erasure.

In one implementation, a current pulse includes a region of fast slew rate that temporally correlates with a time when an erasure risk is diminished, such as at a time when an average magnetic field generated by the write pole is high. Likewise, a region of slow slew rate may temporally correlate with a time when the risk of erasure is higher, such as at a time when the write field generated by the write pole 148 reverses magnetic polarity (e.g., when the magnetization of the tip 142 crosses zero). A region of a pulse "temporally correlates" with a time if the region directly impacts magnetization dynamics at that time, even if the current pulse is received at the write coil 146 at a preceding time (e.g., tens of picoseconds).

In either of the above described implementations, "temporal correlation" of the reduced/increased slew rate region with an observed magnetic characteristic of the write pole 148 may take into account a delay ($\Delta t$) that generally occurs between receipt of the write current pulse at the write coil 146 and a time of resulting magnetization change in the tip 142 of the write pole 148. For example, a slow slew rate region may temporally correlate with a time of write field magnetic reversal if the slow slew rate region is received at the write coil 146 at a time approximately $\Delta t$ before the magnetic reversal occurs.

One example profile of a write current pulse produced by the preamplifier 134 has a high initial slew rate followed by a reduced slew rate region, and then another region of fast slew rate. By timing the region of slow slew to temporally correlate with magnetic reversal of the tip 142, a decrease in magnetic charge on the write pole is observed at a time when magnetization of the write pole tip is weakest. Consequently, erasure risks are reduced.

Figure 2:
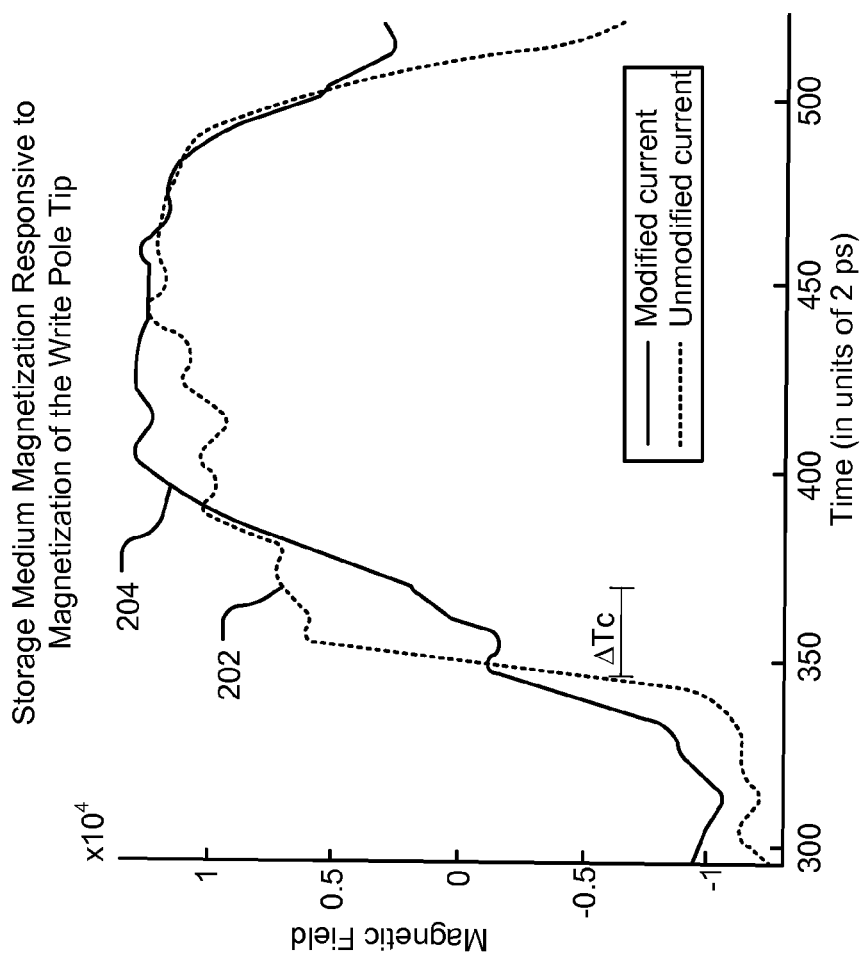
FIG. 2 illustrates magnetization of a write pole tip in response to two different example write current pulses.

FIG. 2 illustrates magnetic field in a storage medium due to write pole tip as a function of time (in units of 2 picoseconds). The magnetic field in the media is plotted in response to two different example write current pulses. A first example response scenario 204 illustrates magnetization of a write pole tip over time in response to receipt of a typical (unmodified) write pulse.

A second example response scenario 202 illustrates magnetization of a write pole tip over time in response to receipt of a modified write pulse. The write current pulse associated with the second response scenario 202 is modified to include time-dependent characteristics that reduce a likelihood of unintentional data erasure.

The unmodified current pulse (e.g., the response scenario 202) results in an exponential-like write-field profile with fast slew rate when the magnetization of the medium crosses zero. In contrast, the slew rate of the modified write current pulse (e.g., the response scenario 204) is much more uniform (as in 204), or even selectively reduced during a "critical erasure time period" (illustrated by $\Delta Tc$) so that less magnetic flux affects the writer at the time when erasure is likely. Although the location and duration of the critical erasure time period $\Delta Tc$ can differ in different writers and also from one writer to another, the critical erasure time period $\Delta Tc$ generally correlates with a time when the magnetization of the write pole tip reverses magnetic polarity.

By reducing the slew rate at a time when the average amplitude of the magnetic field is weak (e.g., at close to zero) magnetic flux leakage near the flare region is reduced. Consequently, the rate of unintentional data erasure decreases.

Figure 3:
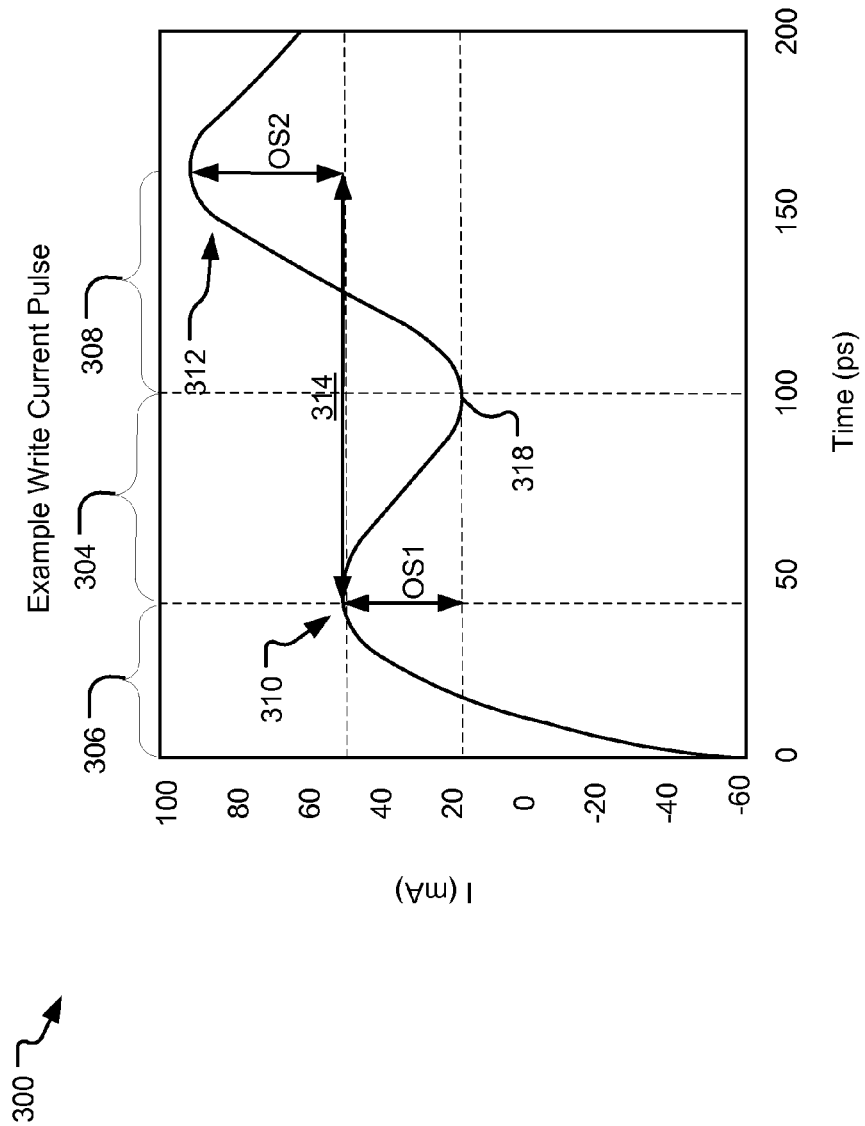
FIG. 3 illustrates a segment of an example write pulse with time-dependent characteristics that help mitigate unintentional erasure of data on a storage media.

FIG. 3 illustrates a segment of an example write pulse 300 with time-dependent characteristics that help mitigate unintentional erasure of data on a storage media. The write pulse 300 is transmitted as an electrical current to one or more coils of a writer that transform the electrical current into a magnetic field and direct the resulting magnetic flux density through a write pole to write data to a storage media (e.g., as shown in FIG. 1). The current strength of the write pulse 300 is depicted in milliamps (mA) on the vertical axis, while time is depicted in picoseconds (ps) in the horizontal direction.

The write pulse 300 includes two peaks 310 and 312 separated by a distance 314. An early region 306 has a slew rate that is large in both current and magnetization. The early region 306 corresponds to a time when the flare region of the write pole is not yet magnetized by the write current pulse, when the likelihood of erasure is low. The slew rate crosses zero at the top of the first peak 310, averages a negative value in a middle region 304, and again hits zero at a local minima 318 (where the current is about 20 mA). In a later region 308, following the local minima 318, the slew rate again ramps up and the current rises to an absolute maximum (e.g., about 90 mA) at a top of the second peak 312. In FIG. 3, the illustrated pulse segment 300 has an expected rise time on the order of about 140 ps. The middle region 304 is a preselected region having an average slew rate that is less than either the average slew rate of either the early region 306 or the later region 308.

A first overshoot "OS1" is defined as the vertical distance between the top of the first peak 310 and the local minima 318. A second overshoot "OS2" is defined as the vertical distance between the top of the first peak 310 and the top of the second peak 312. In various implementations, the location of the first peak 310, the second peak 312, and the magnitude of OS1 and OS2 may vary based on design criteria of each individual writer, recording device, or performance goals of a given system. However, testing has shown that, in general, the magnitude of OS1 has a strong effect on rise time and a relatively small effect on erasure. Provided a distance 314 between the center of the first peak 310 and the second peak 312 is large enough, the impact of the magnitude of OS2 on erasure is also minimal. As such, the ratio between the peak separation 314 and the value OS1/OS2 is what defines optimal performance.

Figure 4:
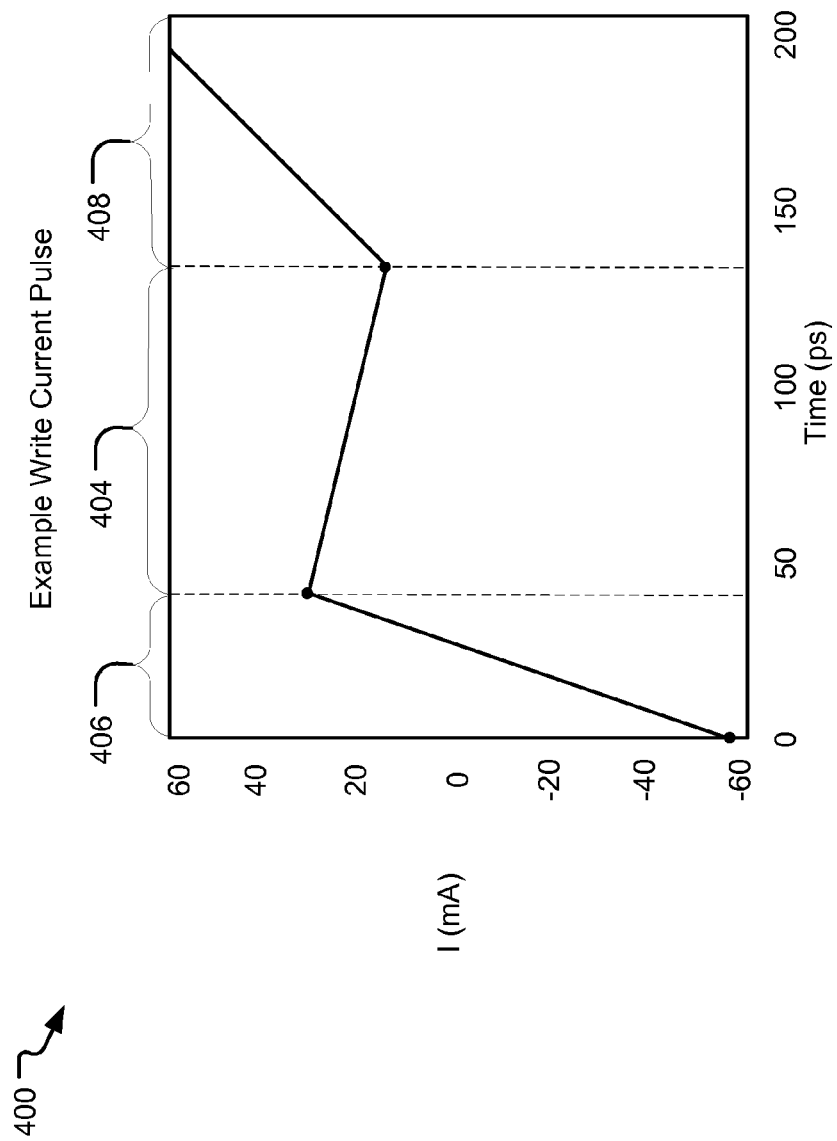
FIG. 4 illustrates a segment of an example write pulse with time-dependent characteristics that help mitigate unintentional erasure of data on a storage media.

FIG. 4 illustrates a segment of an example write pulse 400 with time-dependent characteristics that help mitigate unintentional erasure of data on a storage media. The write pulse 400 includes an early region 406, between 0 and about 60 ps, with a slew rate that is large in both current and magnetization.

In the early region 406, the current of the write pulse 400 goes from −40 mA to just about 20 mA. This early portion corresponds to a time when the flare region of the writer is not yet magnetized by the write pulse, when the likelihood of erasure is low.

A middle region 404 is a predetermined region that corresponds to a time period during a magnetic transition when the flare region is significantly magnetized before the write pole tip switch polarity. The slew rate of the middle region 404 is reduced in comparison to the slew rate of the early region 406 and of a later region 408. Within the middle region 404, the current slowly climbs from about 20 mA to about 30 mA. After reaching 30 mA, the slew rate of the write pulse 400 again continues to increase in a later region 408. An absolute maximum current value (not shown) of about 75 mA is reached at a time between about 40 and 70 ps. After reaching the absolute maximum, the current relaxes back to a steady state value of about 40 mA. A total duration of the entire current pulse 400 (including portions not shown on the plot on FIG. 4) may span a time period about or greater than 220 ps, and have an expected rise time on the order of 190 ps.

In another implementation, the current climbs more slowly throughout the early region 406 and middle region 404 as compared to FIG. 4. For example, the current may slowly climb to between about 20 mA and 40 mA in as long as 160-200 ps from the start of the current pulse. Subsequently, the current may rapidly increases to as high as 100 mA over a time of about 25-70 ps. Such an implementation may entail the least amount of change to other current profiles that do not include time-dependent shaping for erasure mitigation.

As in other implementations disclosed herein, the amplitude and/or time length of the reduced current slew rate region 404 can be increased to further decrease the risk of erasure. However, such modification may result in an increase in current rise time and an associated decrease in system performance (e.g., the BER).

Figure 5:
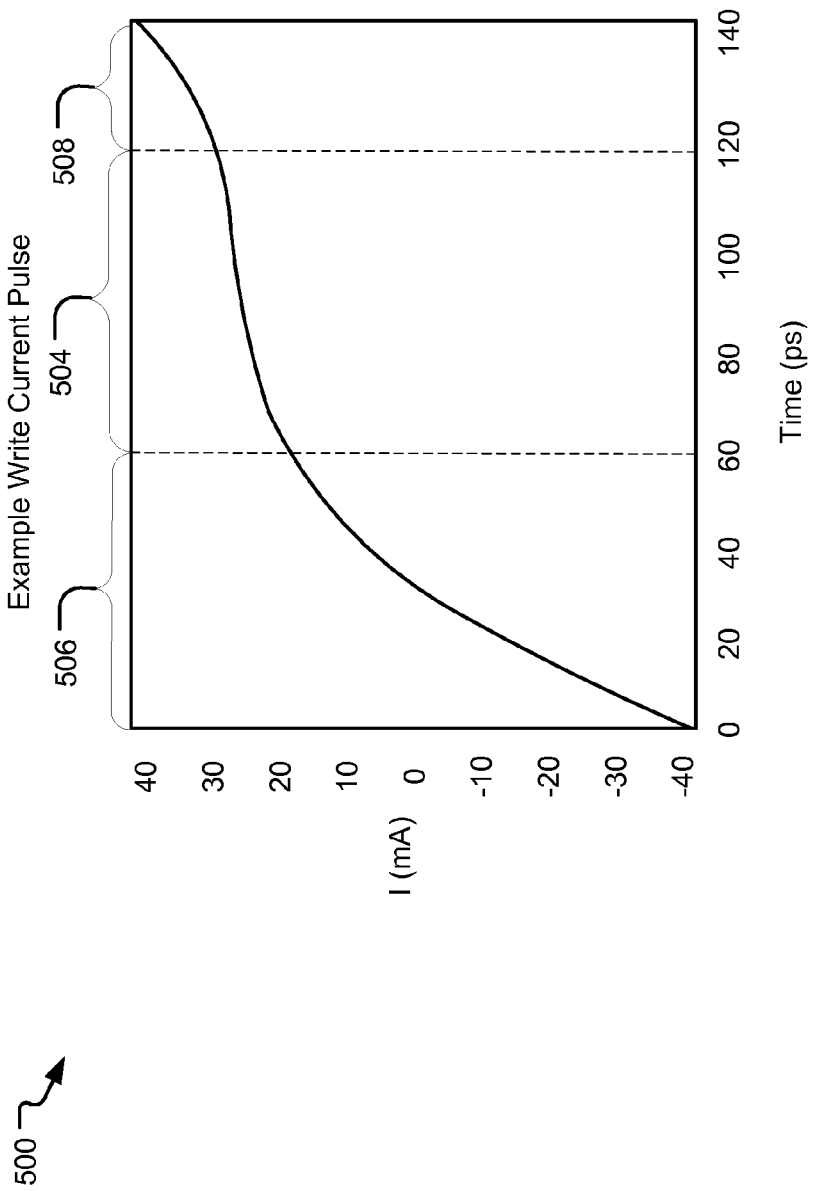
FIG. 5 illustrates a segment of another example write pulse with time-dependent characteristics that help mitigate unintentional erasure of data on a storage media.

FIG. 5 illustrates a segment of another example write pulse 500 with time-dependent characteristics that help mitigate unintentional erasure of data on a storage media.

The write pulse 500 includes a reduced slew rate region 504 that corresponds to a critical erasure time period when the likelihood of erasure is high. The reduced slew rate region 504 exists during current "ramp-up," before the current reaches a maximum value (e.g., sometime after 200 ps). By decreasing the slew rate and/or the current within the critical erasure time period, unintentional erasure can be mitigated or eliminated. By increasing the slew rate and/or current outside of the critical erasure time period, good on-track system performance is also maintained.

The write pulse 500 includes an early region 506 with a slew rate that is large in both current and magnetization. The early region 506 may correspond to a time when the flare region of the write pole (e.g., the flare region 144 of FIG. 1) is not yet magnetized by the current pulse, when the likelihood of erasure is low. The region with the reduced slew rate 504 is predetermined and corresponds to a time period after the flare region has become magnetized but before the write pole tip has reversed in magnetic polarity. During this time period, the likelihood of erasure is higher than in the time period corresponding to the early region 506.

In the reduced slew rate region 504, the write current magnitude is reduced and the slew rate of the current (but not magnetization) is negative. The slew rate again increases quickly in a later region 508, reaching a maximum value at a subsequent time (not shown). The later region 508 corresponds to a time when the write pole tip is magnetized and a proper flux path is established into an adjacent media surface.

In some implementations, the write pulse 500 may include a number of small variations in current amplitude and/or slew rate that are not visible in FIG. 5. Regardless of these variations, the average slew rate of the reduced slew rate region 504 is less than the average slew rate of either the early region 506 or the later region 508.

Figure 6:
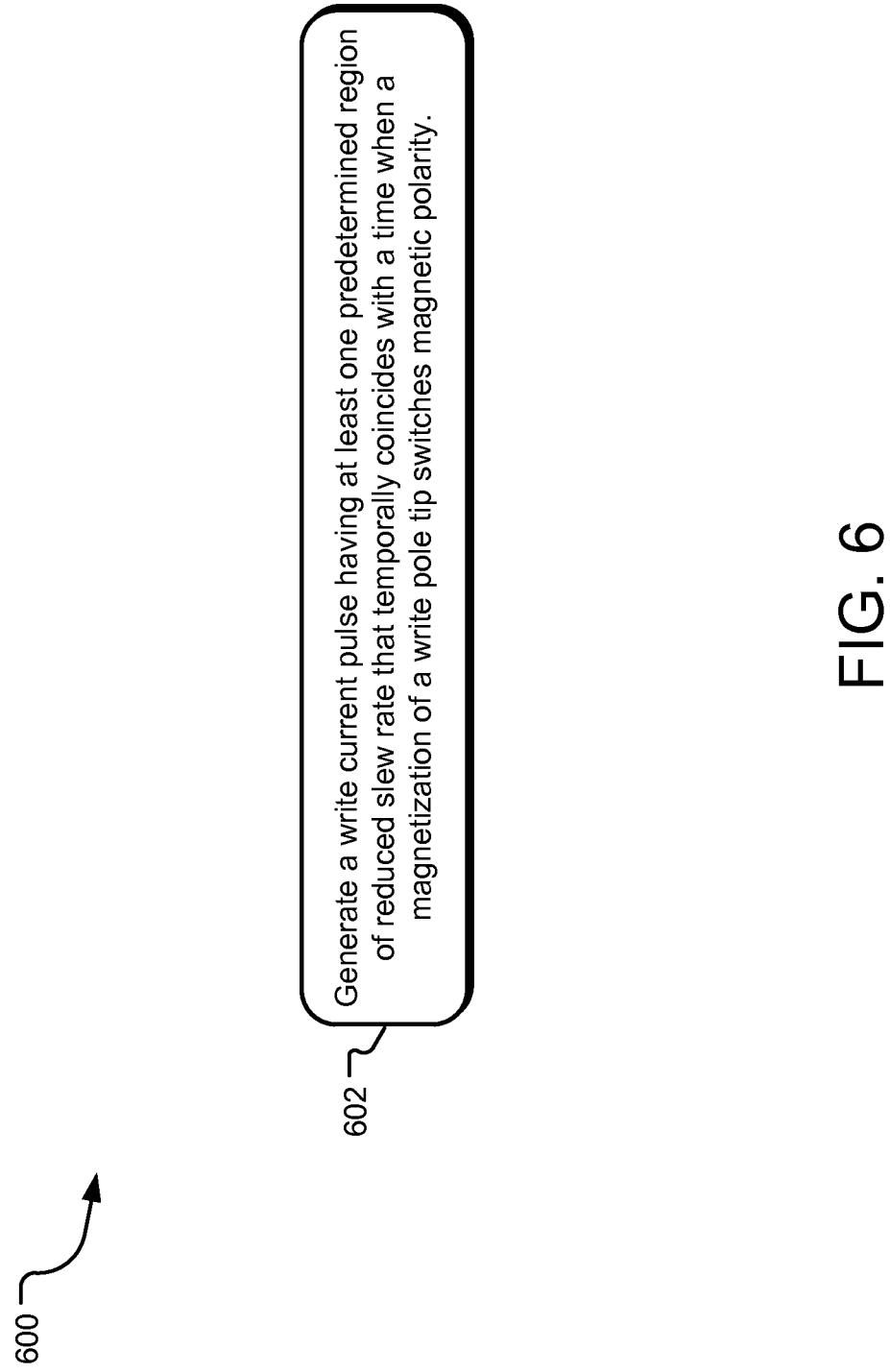
FIG. 6 is a flowchart illustrating example operations for creating a write current pulse with time-dependent characteristics that help mitigate unintentional erase of data on a storage media.

FIG. 6 is a flowchart illustrating example operations 600 for creating a write current pulse with time-dependent characteristics that help mitigate unintentional erase of data on a storage media. A generating operation 602 generates a write current pulse in a magnetic recording device. The write current pulse has at least one predetermined region of reduced slew rate that temporally correlates with a time when a magnetization of a write pole tip switches magnetic polarity. By timing the region of reduced slew rate to temporally correlate with magnetic reversal of a write pole tip, a decrease in magnetic charge on the write pole is observed at a time when magnetization of the write pole tip is weakest. Consequently, erasure risks are reduced. In one implementation, the write current pulse is generated by a preamplifier according to at least one setting that specifies a location and magnitude for a region of reduced slew rate.

The above specification, examples, and data provide a complete description of the structure and use of exemplary implementations of the technology. Since many implementations of the technology can be made without departing from the spirit and scope of the technology, the invention resides in the claims hereinafter appended. Furthermore, structural features of the different implementations may be combined in yet another implementation without departing from the recited claims.

What is claimed is:

1. A method comprising:
    generating a write current pulse in a magnetic recording device, the write current pulse having a predetermined region of reduced slew rate as compared to another region of the write current pulse, the reduced slew rate region occurring prior to an absolute maximum of the write current pulse and temporally coinciding with a time when a magnetization of a write pole tip switches polarity.

2. The method of claim 1, wherein the write current pulse reaches a maximum value at a time after the magnetization of the write pole tip switches polarity.

3. The method of claim 1, wherein the slew rate of the region of reduced slew rate is reduced as compared to a slew rate in a region temporally preceding the region of reduced slew rate.

4. The method of claim 3, wherein the slew rate of the region of reduced slew rate is reduced as compared to a slew rate in a region temporally following the region of reduced slew rate.

5. The method of claim 1, wherein the amplitude of the write current pulse reaches a local maximum before the region of reduced slew rate and reaches an absolute maximum after the region of reduced slew rate.

6. The method of claim 5, further comprising:
dynamically determining a separation between the local maximum and the absolute maximum based on the length of the write current pulse.

7. The method of claim 5, further comprising:
dynamically determining a separation between the local maximum and the absolute maximum based on a data rate of a magnetic recording system.

8. The method of claim 1, wherein the slew rate of the write current pulse is negative at the time when the magnetization of the write pole tip switches polarity.

9. An apparatus comprising:
a magnetic recording device configured to generate a write current pulse having a predetermined region of reduced slew rate as compared to another region of the write current pulse, the region of reduced slew occurring prior to an absolute maximum of the write current pulse and rate temporally coinciding with a time when a magnetization of a write pole tip switches polarity.

10. The apparatus of claim 9, wherein the write current pulse reaches a maximum value at a time after the magnetization of the write pole tip switches polarity.

11. The apparatus of claim 9, wherein the region of reduced slew rate has an average slew rate that is smaller in magnitude than an average slew rate in a region starting at a beginning of the write current pulse and ending at the beginning of the region of reduced slew rate.

12. The apparatus of claim 11, wherein the region of reduced slew rate has an average slew rate that is smaller in magnitude than an average slew rate in a region starting at an end of the region of reduced slew rate and ending at a time when a maximum current amplitude is reached.

13. The apparatus of claim 9, wherein the amplitude of the write current pulse reaches a local maximum before the region of reduced slew rate and reaches an absolute maximum after the region of reduced slew rate.

14. The apparatus of claim 10, wherein the preamplifier is further configured to dynamically determine a separation between the local maximum and the absolute maximum based on a length of the write current pulse.

15. The apparatus of claim 10, wherein the preamplifier is further configured to dynamically determine a separation between the local maximum and the absolute maximum based on a data rate of the magnetic recording device.

16. The apparatus of claim 9, wherein the slew rate of the write current pulse is negative at the time when the magnetization of the write pole tip switches polarity.

17. A method comprising:
generating a write current pulse in a magnetic recording device, the write current pulse having a slew rate equals zero at a predetermined time when a magnetization of a write pole tip transitions between a zero and a non-zero value.

18. The method of claim 17, wherein the slew rate increases to a maximum value at a time after the net magnetization of the write pole tip switches polarity.

19. The method of claim 17, wherein the region of reduced slew rate has an average slew rate that is smaller in magnitude than an average slew rate in a region starting at a beginning of the write current pulse and ending at the beginning of the region of reduced slew rate.

20. The method of claim 17, wherein the region of reduced slew rate has an average slew rate that is smaller in magnitude than an average slew rate in a region starting at an end of the region of reduced slew rate and ending at a time when a maximum current amplitude is reached.

* * * * *